A. B. LANDIS.
CUTTER HEAD.
APPLICATION FILED JULY 18, 1912.

1,220,348.

Patented Mar. 27, 1917.

4 SHEETS—SHEET 1.

Witnesses
Frank E. Rapp
F. Wm. Ernst

Inventor
Abraham B. Landis,
By Bradford & Doolittle
Attorneys

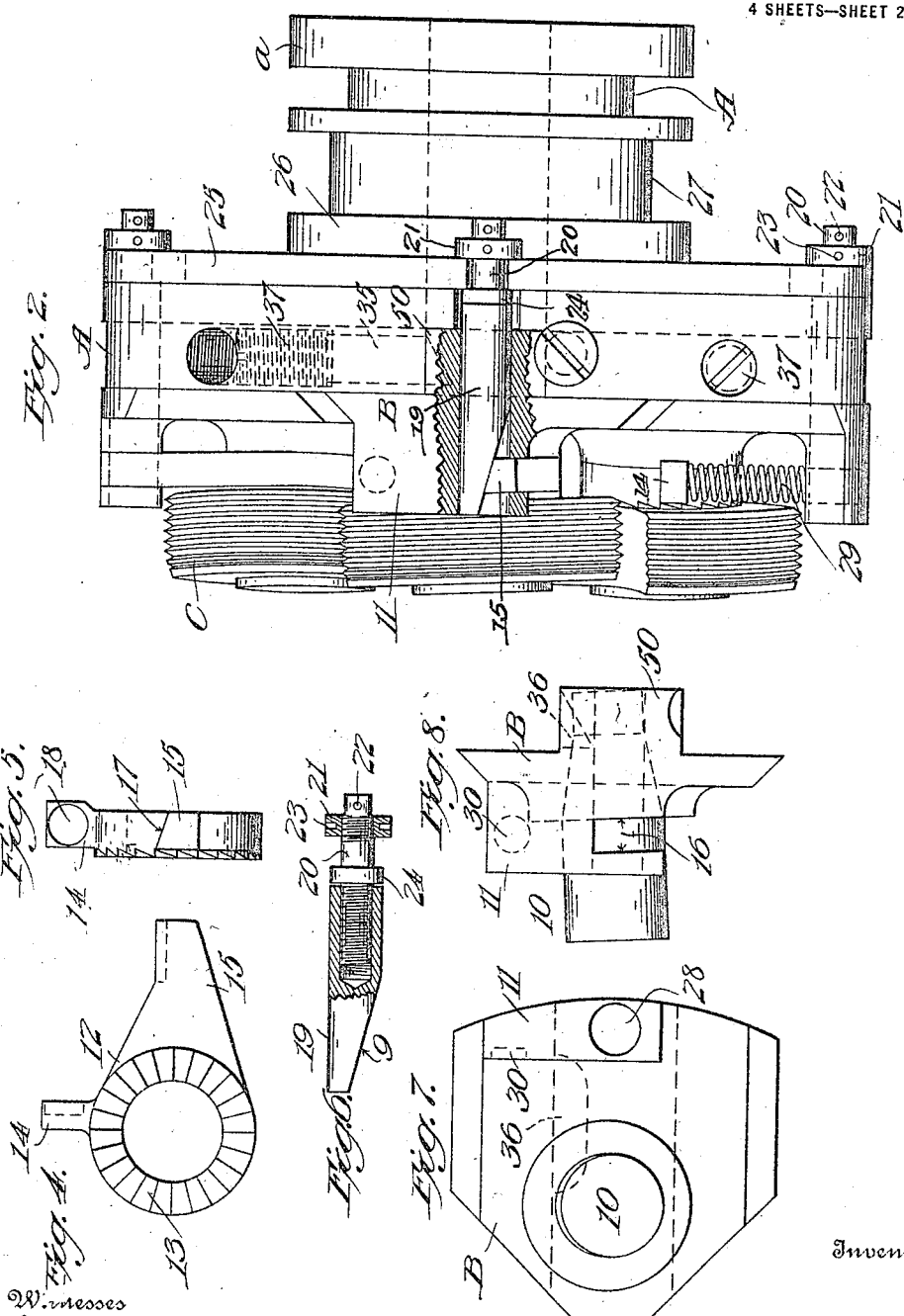

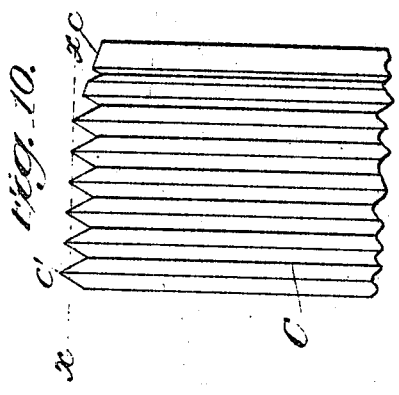
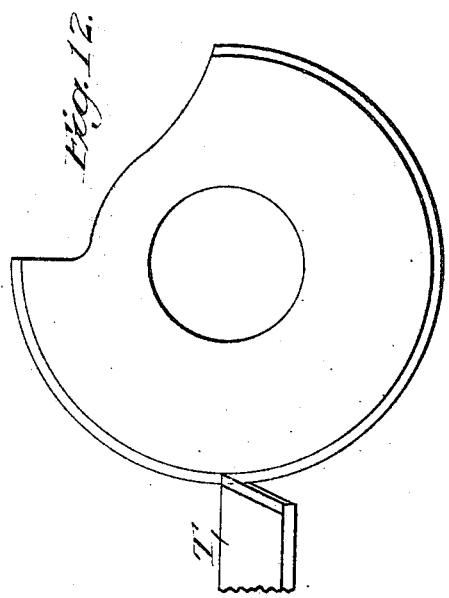
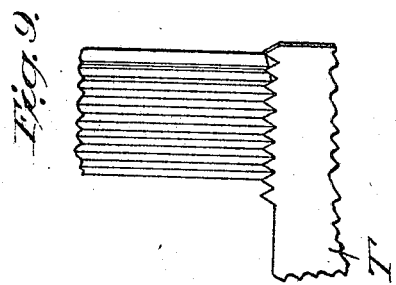
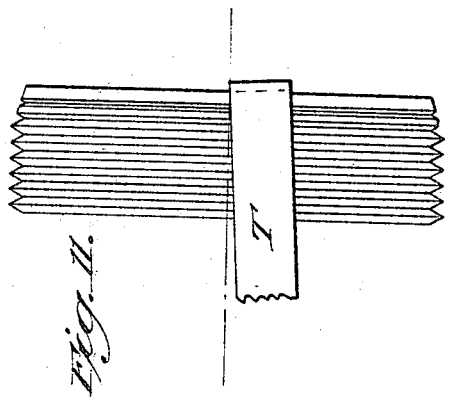

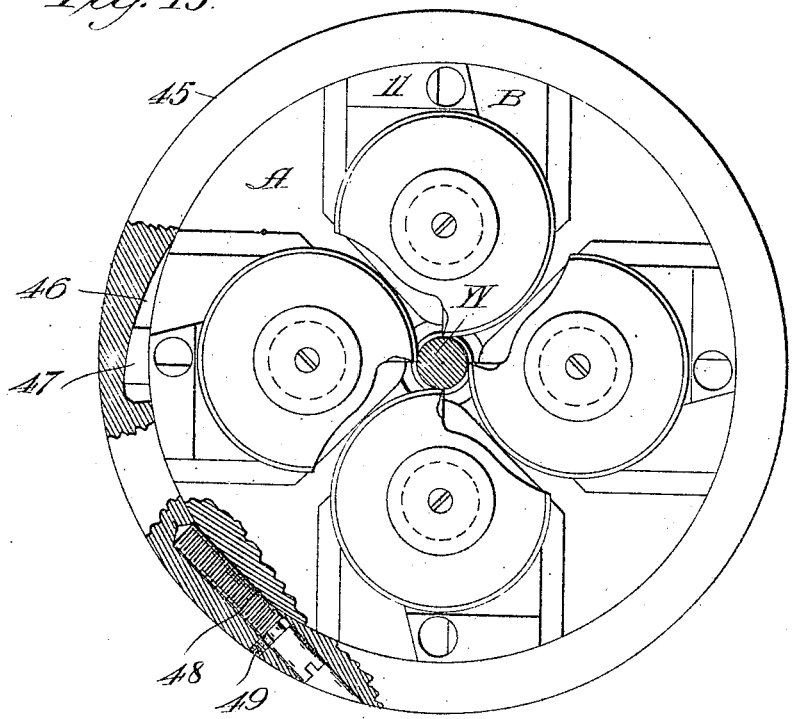

UNITED STATES PATENT OFFICE.

ABRAHAM B. LANDIS, OF ENFIELD, PENNSYLVANIA.

CUTTER-HEAD.

1,220,348.  Specification of Letters Patent.  Patented Mar. 27, 1917.

Application filed July 18, 1912. Serial No. 710,290.

*To all whom it may concern:*

Be it known that I, ABRAHAM B. LANDIS, a citizen of the United States, residing at Enfield, Montgomery County, and State of Pennsylvania, have invented and discovered certain new and useful Improvements in Cutter-Heads, of which the following is a specification.

My said invention consists in various improvements in the details of construction and arrangement of parts of cutter-heads for cutting threads on bolts, screws, etc., whereby such a tool is provided of rigid construction and one capable of ready and easy adjustment, all as will be hereinafter more fully described and claimed.

Figure 1:
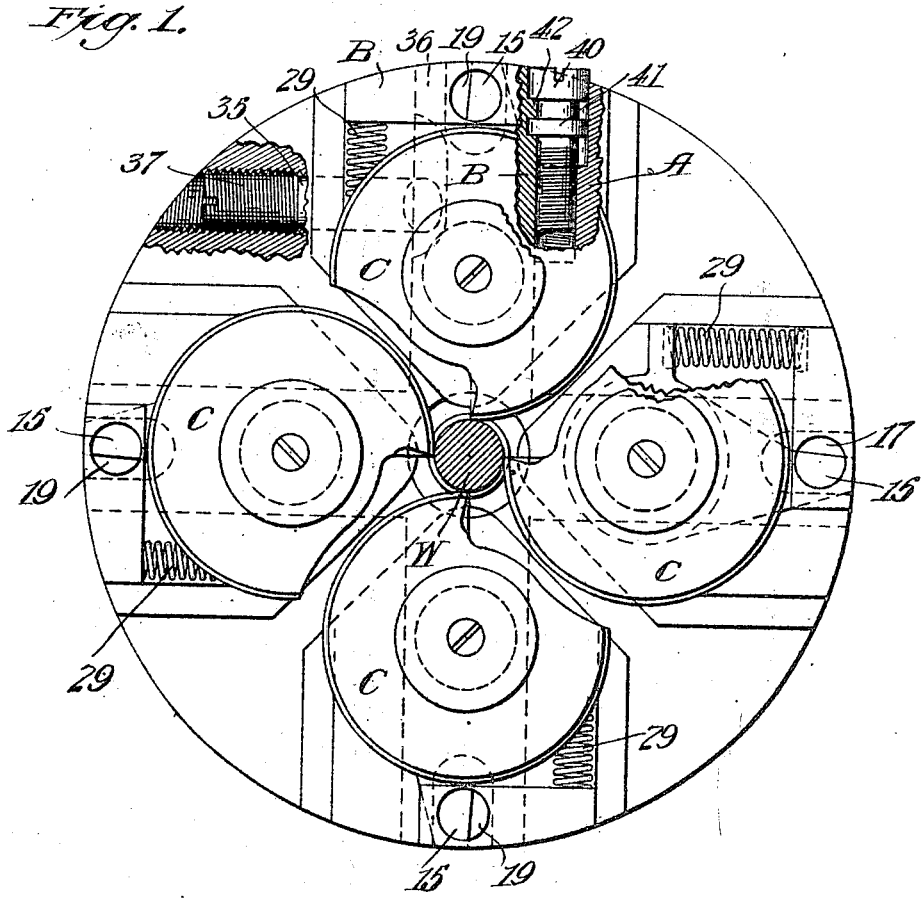

Referring to the accompanying drawings, which are made a part hereof and on which similar reference characters indicate similar parts, Figure 1 is a face view of a cutter-head of my improved construction with portions thereof broken out to show interior details more clearly.

Figure 3:
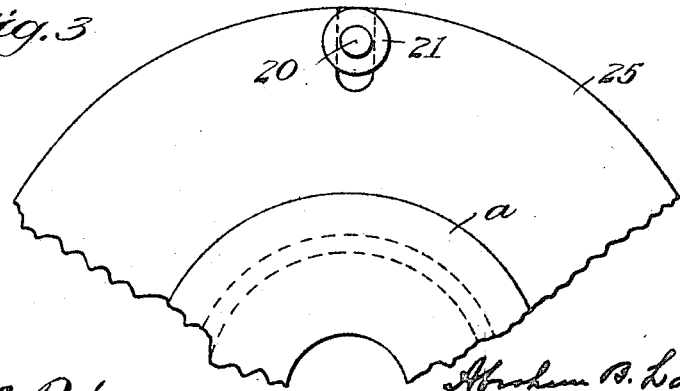

Fig. 2 a side elevation with a portion broken out to illustrate one of the details more clearly, Fig. 3 a detail rear elevation, Fig. 4 a face view of a part of the securing and adjusting means, Fig. 5 an edge view of the same, Fig. 6 a detail view partly in elevation and partly in section, showing the construction of the adjusting wedge, Fig. 7 a face view of the cutter holder, Fig. 8 an end elevation thereof, Figs. 9, 10, 11, and 12, detail views illustrating more clearly the particular form of cutter and its operation upon the work, and Fig. 13 a view similar to Fig. 1 showing a modified construction.

In said drawings the portions marked A represent the main body of the cutter head, B the cutter holders, and C the cutters.

The body A is of a form adapted to be mounted upon the spindle or turret of the machine, having a face plate *a* for the purpose of the attachment in the usual or any approved manner. It is formed with suitable recesses to receive the cutter hold and otherwise formed to appropriately support the several parts.

The cutter holders B are of the form most clearly illustrated in Figs. 7 and 8, each comprising a base plate having a trunnion 10 extending forward from said base which is adapted to seat upon the face of the body, and a tongue 50 adapted to be mounted and slide in an appropriate radial recess in the body A and with an overhanging flange 11 on its outer edge to afford supports and bearings for several parts, as will be presently described.

Said cutter holders are mounted by means of their tongues 50 in suitable radial recesses in the body A equi-distant around its axis, and are secured in place by sliding detents 35 with tapered inner ends mounted to slide in perforations in body A at right angles to the recesses containing said cutter holders, their inner ends engaging the tapered face of a recess 36 in the adjacent side of each tongue 50. A screw-plug 37 is mounted in the outer end of each perforation and bears upon the outer ends of the respective detents, and their tapered points and the tapered faces of recesses 36 are so disposed in relation to each other that the forcing of said detents inward by screws 37 will draw the base plates of holders B tightly to their seats and hold them rigidly in position.

The cutter holders B are mounted with tongues 50 in said radial recesses and held in radial adjustment by means of screws 40, as best shown in Fig. 1, said screws being formed with an annular rib or flange 41 which engages with a groove in holder B and said holder is formed with a tongue 42 which engages between said flange and the head of the screw, forming an engagement for said screw to move the cutter holder in relation to the body, said screw engaging a screw threaded perforation in body A, so that by turning said screw said cutter holders may be adjusted independently one of the other in a radial direction.

Fig. 13 shows a modification having a ring 45 mounted around the body A adjacent to the outer ends of the cutter holders B and formed with a series of cam faces 46, opposite the outer ends of said cutter holders. Radially projecting bearing blocks 47 are formed on the outer edges of said cutter holders to bear against said cam faces. A tangential screw 48 is mounted, by means of a radial screw 49 engaging with a circular groove therein, to turn in said ring 45 with its screw threaded part engaging with threads in the periphery of said body A. By turning said screw through the medium of a screw-driver said ring is rotated in relation to the periphery of said body and the several cutter holders thus adjusted radially and simultaneously.

The trunnions 10 extend forward from the base of the holders B at a slight angle, as clearly indicated in Figs. 2, 7, and 8. Mounted on said trunnions adjacent to the base plate is a ring 12 formed with ratchet teeth 13 on its outer face and with two radial arms 14 and 15 standing at right angles to each other. Arm 15 extends outward through a recess or slot 16 in the flange 11 and is formed with a tapered face 17, as best shown in Fig. 5. Arm 14 has a circular recess to form a bearing 18 for the end of a spring 29, as best shown in Figs. 2 and 5.

Sliding cylinders 19 are mounted in longitudinal perforations in the body A and formed with cam faces 9. They are preferably provided at their outer ends with adjusting bolts 20 connected therewith by a screw-threaded connection, as best shown in Fig. 6. On the outer end of each of said bolts is mounted a nut or collar 21 by means of a screw-threaded connection. Said bolt is provided with radial sockets 22 and said nut with radial sockets 23, whereby they may be turned, respectively, by means of an appropriate pin or other suitable device. By this means the position of the cam may be adjusted and also the distance between the rigid collar 24 on said bolt and the adjustable collar 21 near its outer end. Said several bolts are each connected with a ring 25 carried by a sliding sleeve 26 mounted to have a limited longitudinal movement upon body A, the connection being by means of open radial slots engaging said bolts between the collars 21 and 24, as best shown in Fig. 3. Said sleeve 26 is provided with an annular groove 27 with which a shifting fork (not shown) may engage for the purpose of sliding the same. The inner ends of said cylinders 19 project through perforations 28 in the overhanging flange 11 of the cutter holders B across the slots 16 and over the tapered faces 17 of the arms 15 of the rings 13, the cam faces 9 bearing upon said tapered faces 17 respectively.

The cutters C are circular in form and mounted upon the trunnions 10 of the cutter holders B which trunnions are arranged equidistant from the center of the body, the four cutters forming a cutter die around the work W, as shown in Figs. 1 and 2. Said cutters C are formed with an annular toothed portion on their rear faces, the teeth of which are adapted to engage with the ratchet teeth 13, whereby said cutters are held to rotate with ring 12. Springs 29 are interposed between the bearing 18 in the face of arm 14 of ring 12 and in appropriate bearings 30 in the overhanging head 11 of each cutter holder and operate said cutters reversely to the sliding cams 19.

In Figs. 9, 10, 11, and 12, I show more clearly the particular form of the cutter in its relation to the work. By reference to these views it will be noted that the outer edge as at $c$ where the cutting is done is lower and of a smaller diameter than the inner edge as at $c^1$, and by the dotted line $x$—$x$ in Fig. 10 it will be noted that the points of the cutting teeth or edges project further from the center of the head at the outer end than at the inner end of the cutter. Said cutting face is formed by a cutting tool T, (Figs. 9, 11, and 12) disposed to the periphery of the cutter at the same angle and position as the cutter face will occupy to the screw blank or work, thus generating a face that will engage the threads of the work for its full width and lead said work into the die positively and correctly. The outer edge of the cutter standing tangentially to the work its face will be generated to increase in distance from the center on an irregular curved line, as most clearly shown in Fig. 10, the general transverse line of said face being slightly concave, as shown.

Inasmuch as the cutters are mounted on trunnions extending at an angle to the face of the head, they will stand at an angle across the work as illustrated more clearly in Fig. 11, and their faces being thus formed will insure that the threads shall be cut at the proper pitch.

Having thus fully described my said invention what I claim as new and desire to secure by Letters Patent is:

1. A cutter-head comprising a body, cutter holders mounted in ways in the face of said body, means for adjusting said cutter holders radially, trunnions carried by said cutter holders and extending at an angle to the face of the head, cutters mounted to turn on said trunnions, means for oscillating said cutters, means for securing said cutters circumferentially, and means for adjusting said cutter holders radially, substantially as set forth.

2. A cutter-head comprising a body, cutter holders mounted in radial ways on said body, trunnions carried by said cutter holders, a toothed ring mounted on said trunnions, circular cutter holders mounted on said trunnions having teeth engaging the teeth of said toothed rings, means for turning said toothed rings positively in one direction, and means for normally holding them against said positively operating means, substantially as set forth.

3. A cutter-head comprising a body, cutter holders mounted thereon, trunnions carried by said cutter holders, a ring mounted on each of said trunnions formed with teeth in its outer face, a cutter mounted on each of said trunnions formed with teeth adapted to engage the teeth of said rings, a sliding cam adapted to operate against a radial arm extending from said ring to turn it in one direction, and a spring bearing against another radial arm for turning it in the opposite direction, substantially as set forth.

4. A cutter-head comprising a body, cutter holders having trunnions, circular cutters mounted on said trunnions, a ring interposed between said circular cutters and the base of the cutter holders and adapted to engage therewith by interengaging teeth, said ring being formed with arms extending at right angles to each other, sliding cams for engaging one of the arms of said several cutter holders, springs for bearing against the other arm of said several cutter holders, and means for sliding said cams, substantially as set forth.

5. A cutter head comprising a body, cutter holders mounted to slide radially on said body, trunnions carried by said cutter holders, circular cutters mounted on said trunnions, means for securing said cutters to said trunnions, means for oscillating said cutters, means for adjusting said cutters circumferentially on said trunnions, and means for adjusting each of said cutter holders independently in a radial direction, substantially as set forth.

6. A cutter-head comprising a body having radial ways formed in the face thereof, cutter holders mounted in said ways on said body, trunnions carried by said cutter holders, circular cutters mounted on said trunnions, means for securing said cutters in circumferential adjustment on said trunnions, means for oscillating said cutters, and an adjusting screw connected with each of said cutter holders and engaging a screw-threaded perforation in said body, whereby each of said cutter holders may be adjusted independently, substantially as set forth.

7. A cutter-head comprising a body, trunnions mounted on bases adapted to be adjusted radially across said body, said trunnions extending at an angle to the face of said body, circular cutters mounted on said trunnions formed with cutting grooves in their peripheries, and with the outer edge of the cutter of less diameter than its inner edge.

8. A circular cutter for cutter-heads having its periphery formed concave with its diameter, greater at its rear than its front, the curve of said concave being irregular due to generation to adapt it to its work, substantially as set forth.

9. A circular cutter for cutter-heads having its periphery formed concave with its diameter greater at its rear than its front, said concave having a varying curve due to generation, substantially as set forth.

In witness whereof, I have hereunto set my hand and seal at Washington, District of Columbia, this fifteenth day of July, A. D. nineteen hundred and twelve.

ABRAHAM B. LANDIS. [L. S.]

Witnesses:
   E. W. BRADFORD,
   E. G. CLEMENTS.